United States Patent
Campbell

(10) Patent No.: US 7,067,447 B2
(45) Date of Patent: Jun. 27, 2006

(54) STRAIN TOLERANT AGGREGATE MATERIAL

(75) Inventor: Christian X. Campbell, Orlando, FL (US)

(73) Assignee: Siemens Power Generation, Inc., Orlando, FL (US)

(*) Notice: Subject to any disclaimer, the term of this patent is extended or adjusted under 35 U.S.C. 154(b) by 250 days.

(21) Appl. No.: 10/654,767

(22) Filed: Sep. 4, 2003

(65) Prior Publication Data

US 2004/0043889 A1    Mar. 4, 2004

Related U.S. Application Data

(63) Continuation-in-part of application No. 10/158,946, filed on May 31, 2002, now Pat. No. 6,709,230.

(51) Int. Cl.
*C04B 35/50*    (2006.01)
*C04B 35/185*   (2006.01)
*B32B 9/00*     (2006.01)

(52) U.S. Cl. ............... 501/152; 501/128; 501/127; 415/200; 428/325; 428/329; 428/450; 428/469; 428/472; 416/241 B

(58) Field of Classification Search ............... 501/127, 501/128, 152; 415/200; 416/241 B; 428/325, 428/329, 450, 469, 472
See application file for complete search history.

(56) References Cited

U.S. PATENT DOCUMENTS

| | | | |
|---|---|---|---|
| 3,910,716 A | 10/1975 | Roughgarden et al. | |
| 4,396,349 A | 8/1983 | Hueber | |
| 4,519,745 A | 5/1985 | Rosman et al. | |
| 4,530,884 A | 7/1985 | Erickson et al. | |
| 4,563,125 A | 1/1986 | Boudigues et al. | |
| 4,563,128 A | 1/1986 | Rossmann | |
| 4,629,397 A | 12/1986 | Schweitzer | |
| 4,639,189 A | 1/1987 | Rosman | |
| 4,643,636 A | 2/1987 | Libertini et al. | |
| 4,645,421 A | 2/1987 | Huether | |
| 4,768,924 A | 9/1988 | Carrier et al. | |
| 4,790,721 A | 12/1988 | Morris et al. | |
| 4,838,031 A | 6/1989 | Cramer | |
| 4,907,946 A | 3/1990 | Ciokajlo et al. | |
| 5,027,604 A | 7/1991 | Krueger | |
| 5,226,789 A | 7/1993 | Donges | |
| 5,306,554 A | 4/1994 | Harrison et al. | |
| 5,314,309 A | 5/1994 | Blakeley et al. | |
| 5,322,823 A * | 6/1994 | Ueda et al. | 501/89 |
| 5,328,331 A | 7/1994 | Bunker et al. | |
| 5,358,379 A | 10/1994 | Pepperman et al. | |
| 5,375,978 A | 12/1994 | Evans et al. | |
| 5,382,453 A | 1/1995 | Mason | |

(Continued)

OTHER PUBLICATIONS

Akopov, F.A., et al. Cerium Dioxide Refractory Materials. UNITECR '89, pp. 1071-1080.

(Continued)

*Primary Examiner*—Karl Group

(57) ABSTRACT

A material (100) formed of a sintered aggregation of ceria particles (106), mullite particles (108) and an alumina matrix material (110). Differential thermal expansion of the ceria and mullite particles generates thermal stress sufficient to create micro-cracking of the ceria particles. The ratio of ceria to mullite may be selected to achieve a desired coefficient of thermal expansion for matching the thermal growth of a mating CMC material (102). The micro cracks provide the material with a desired degree of strain tolerance useful in high temperature applications such as a solid core gas turbine vane (20).

29 Claims, 3 Drawing Sheets

U.S. PATENT DOCUMENTS

| | | | |
|---|---|---|---|
| 5,484,258 A | 1/1996 | Isburgh et al. | |
| 5,493,855 A | 2/1996 | Walters et al. | |
| 5,494,402 A | 2/1996 | Glezer et al. | |
| 5,584,652 A | 12/1996 | Shaffer et al. | |
| 5,605,046 A | 2/1997 | Liang | |
| 5,616,001 A | 4/1997 | Boyd | |
| 5,630,700 A | 5/1997 | Olsen et al. | |
| 5,640,767 A | 6/1997 | Jackson et al. | |
| 5,720,597 A | 2/1998 | Wang et al. | |
| 5,791,879 A | 8/1998 | Fitzgerald et al. | |
| 5,820,337 A | 10/1998 | Jackson et al. | |
| 6,000,906 A | 12/1999 | Draskovich | |
| 6,164,903 A | 12/2000 | Kouris | |
| 6,197,424 B1 | 3/2001 | Morrison et al. | |
| 6,200,092 B1 | 3/2001 | Koschier | |
| 6,241,469 B1 | 6/2001 | Beeck et al. | |
| 6,280,550 B1 | 8/2001 | Steibel et al. | |
| 6,325,593 B1 | 12/2001 | Darkins, Jr. et al. | |
| 6,368,663 B1 | 4/2002 | Nakamura et al. | |
| 6,465,090 B1 * | 10/2002 | Stowell et al. | 428/325 |
| 6,514,046 B1 | 2/2003 | Morrison et al. | |
| 6,554,563 B1 | 4/2003 | Noe et al. | |
| 6,558,814 B1 * | 5/2003 | Spitsberg et al. | 428/633 |
| 6,641,907 B1 * | 11/2003 | Merrill et al. | 428/313.9 |
| 6,709,230 B1 * | 3/2004 | Morrison et al. | 415/115 |
| 6,723,674 B1 * | 4/2004 | Wang et al. | 501/152 |

OTHER PUBLICATIONS

Podkletnov, E.E. et al. Increasing the Thermal-Shock Resistance of Ceramics Based on Cerium Dioxide Plus Additives. Institute of High Temperatures, Academy of Sciences of the USSR. D.I. Mendeleev Moscow Chemical Technology Institute. pp. 144-147. Transl. from Ogneupory, No. 3, pp. 20-22, Mar. 1984.

Podkletnov, E.E. Properties of a Cerium Dioxide Based Ceramic with Filamentary Crystals. Institute of High Temperature, Academy of Sciences of the USSR. Physics Institute, Academy of Sciences of the USSR. p. 307-310. Translated from Steklo I Keramika, No. 7, p. 21-22, Jul. 1984.

Podkletnov, E.E. et al. Structure and Properties of Highly Refractory Ceramics Based on Cerium Dioxide and Its Solid Solutions. Institute of High Temperatures, Academy of Sciences of the USSR. D.I. Mendeleev Moscow Inst. Chemical Technology Institute. pp. 87-90. Transl. from Ogneupory, No. 2, pp. 26-29 (1984).

Podkletnov, E.E. et al. Thermal Shock Resistance and the Mechanical Properties of the Refractory Materials Based on Zirconium and Cerium Dioxides with Layered-Granular Structure. High Temp. Inst, Acadmey of Sciences of the USSR. Scientific-Research Int. of Graphite, p. 476-479, (1986).

Sameshima, S. et al. Thermal Expansion of Rare-Earth-Doped Ceria Ceramics. Journal of the Ceramic Society of Japan, v. 110, No. 7, 2002, pp. 597-600.

Atlantic Equipment Engineers. Cerium Oxide $CeO_2$ $^{172.31}$. Bergenfield, NJ: AEE. www.micronmentals.com/cerium_oxide.htm, no date.

Cerium: A Guide to its Role in Chemical Technology. Published by Molycorp, Inc., Mountain Pass, CA, 1992 (reprinted 1995).

CERAMUL—64. Property. www.mahavir-india.com/products/ceramul-64.htm, no date.

Cerium Oxide Powder. www.reade.com/Products/Oxides/cerium_oxide.html, no date.

Kemco International Associates. Technology Serving the World. Westlake, OH: KIA, Inc., www.kemcointernational.com/CeriumOxide.htm, no date.

Kyanite Mining Corporation. Chemical Analysis. www.kyanite.com/chemicalanalysis.html, no date.

Kyanite Mining Corporation. Typical Particle Size Distribution of Virgnia Kyanite & Mullite. www.kyanite.com/mullitemesh.html, no date.

Kyanite Mining Corporation. Mullite: $3(Al_2O_3)$. $2(SiO_2)$. www.kyanite.com/mullite.html, no date.

Kyanite-Mullite Statistics and Information. http://Minerals.er.usgs.gov/minerals/pubs/commodity/kyanite, no date.

* cited by examiner

STRAIN TOLERANT AGGREGATE MATERIAL

This application is a continuation-in-part of U.S. application Ser. No. 10/158,946 filed May 31, 2002, now U.S. Pat. No. 6,709,230, issued on Mar. 23, 2004.

BACKGROUND OF THE INVENTION

It is known to use ceramic matrix composite (CMC) materials in high temperature environments such as in the hot combustion gas flow path of a gas turbine engine. CMC materials offer the potential for higher operating temperatures than do metal alloy materials due to the inherent nature of ceramic materials. This capability may be translated into a reduced cooling requirement that, in turn, may result in higher power, greater efficiency, and/or reduced emissions from the machine. However, CMC materials generally are not as strong as metal, and therefore the required cross-section for a particular application may be relatively thick. Due to the low coefficient of thermal conductivity of CMC materials and the relatively thick cross-section necessary for many applications, backside closed-loop cooling is generally ineffective as a cooling technique for protecting these materials in combustion turbine applications. Accordingly, high temperature insulation for ceramic matrix composites has been described in U.S. Pat. No. 6,197,424 B1, which is commonly assigned with the present invention and is incorporated by reference herein. That patent describes an oxide-based insulation system for a ceramic matrix composite substrate that is dimensionally and chemically stable at a temperature of approximately 1600° C. That patent also describes a stationary vane for a gas turbine engine formed from such an insulated CMC material. A similar gas turbine vane 10 is illustrated in FIG. 1 herein as including an inner wall 12 and stiffening ribs 14 formed of CMC material covered by an overlying layer of insulation 16. Backside cooling of the inner wall 12 is achieved by convection cooling, e.g. via direct impingement through supply baffles (not shown) situated in the interior chambers 18 using air directed from the compressor section of the engine.

If baffles or other means are used to direct a flow of cooling fluid throughout the airfoil member for backside cooling and/or film cooling, the cooling fluid is typically maintained at a pressure that is in excess of the pressure of the combustion gasses on the outside of the airfoil so that any failure of the pressure boundary will not result in the leakage of the hot combustion gas into the vane. Such cooling passages must generally have a complex geometry in order to provide a precise amount of cooling in particular locations to ensure an adequate degree of cooling without over-cooling of the component. It is generally very difficult to form such complex cooling passages in a ceramic matrix composite component. Alternatively, large central chambers 18 as illustrated in FIG. 1 may be used with appropriate baffling to create impingement of the cooling fluid onto the backside of the surface to be cooled. Such large chambers create an internal pressure force that can result in the undesirable ballooning of the airfoil structure due to the internal pressure of the cooling fluid applied to the large internal surface area of the passage 18. Furthermore, the geometry of FIG. 1 is also limited by stress concentrations at the intersection of the stiffening ribs 14 and the innerwall 12.

BRIEF DESCRIPTION OF THE DRAWINGS

The present invention will be more apparent from the following description in view of the drawings that show.

DETAILED DESCRIPTION OF THE INVENTION

Figure 2:
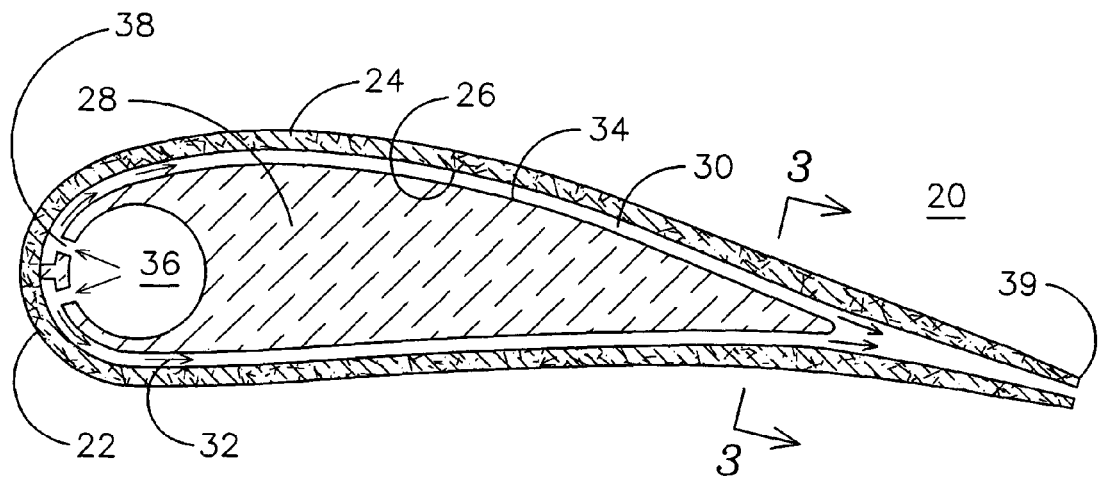
FIG. 2 is a cross-section view of a solid-core ceramic matrix composite gas turbine vane.
Figure 3:
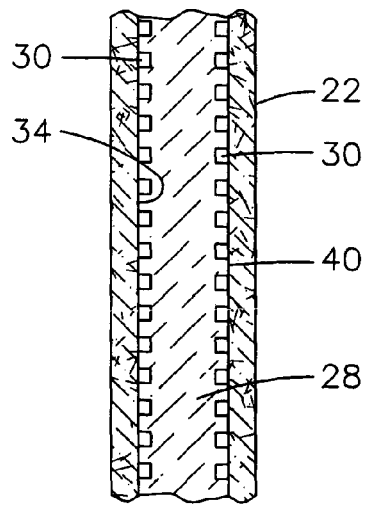
FIG. 3 is a cross-section of the vane of FIG. 2 as viewed along Section 3—3.
Figure 4:
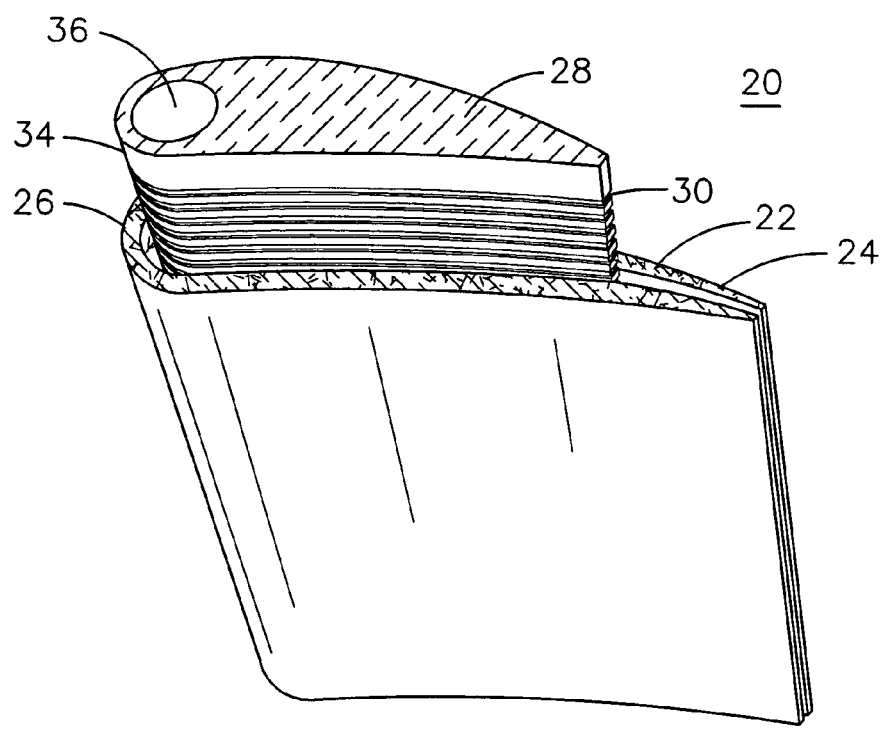
FIG. 4 is a perspective view of the vane of FIG. 2 with the core member partially inserted prior to being bonded to the CMC airfoil member.

FIGS. 2–4 illustrate an improved stationary vane 20 for a gas turbine engine. The vane 20 includes an airfoil member 22 formed from a ceramic matrix composite material having an outer surface 24 defining an airfoil and an inner surface 26 defining a core region. The term ceramic matrix composite is used herein to include any fiber-reinforced ceramic matrix material as may be known or may be developed in the art of structural ceramic materials. The fibers and the matrix material surrounding the fibers may be oxide ceramics or non-oxide ceramics or any combination thereof. A wide range of ceramic matrix composites (CMCs) have been developed that combine a matrix material with a reinforcing phase of a different composition (such as mulite/silica) or of the same composition (alumina/alumina or silicon carbide/silicon carbide). The fibers may be continuous or discontinuous fibers and may take the form of whiskers, platelets or particulates. Reinforcing fibers may be disposed in the matrix material in layers, with the plies of adjacent layers being directionally oriented to achieve a desired mechanical strength. One such CMC material is an oxide/oxide material sold by COI Ceramics of San Diego, Calif., under the name A-N720.

A core member 28 is disposed within the core region of airfoil member 22. The core member 28 is preferably formed from a different material than the airfoil member 22, for reasons that will be explained in more detail below. One or more cooling passages 30 are formed in the core member 28 for passing a cooling fluid 32 to remove heat from the vane 20. In this embodiment, the cooling passages 30 are partially defined by grooves formed into an outer surface 34 of the core member 28. Alternatively, the cooling passages may be holes formed below the outer surface 34 of the core member 28, preferably proximate the outer surface 34 to promote heat transfer between the outer surface 34 and the cooling fluid 32. A plenum 36 is formed in the core member 28 for the introduction of the cooling fluid 32 at one end of the vane 20. Openings 38 connect the plenum 36 and respective ones of the cooling passages 30 for the passage of cooling fluid 32. The size of the plenum is selected to maintain the pressure of the cooling fluid 32 within a predetermined range at each of the plurality of openings 38 along the length of the vane 20. The cooling fluid 32 passes along the cooling passages 30 and eventually exits the vane 20 along its trailing edge 39.

The outer surface 34 of the core member 28 is attached to the inner surface 26 of airfoil member 22 by a bond 40, as may be best seen in FIG. 3. The bond 40 may be a layer of adhesive, or it may be a sintered bond joint created by curing the adjoining core member 28 and airfoil member 22 materials together. The bond 40 provides a heat removal pathway for conductive transfer of heat energy away from the airfoil member 22 into the core member 28, and in turn into the cooling fluid 32. In the embodiment illustrated, there will be some direct heat transfer from the airfoil member 22 to the cooling fluid 32, since the inner surface 26 of the airfoil member 22 forms part of the pressure boundary for the cooling passage 30. Such direct heat transfer between the airfoil member 22 and the cooling fluid 32 will not occur in embodiments where the cooling passage 30 is formed as a subsurface hole in the core member 28. To ensure an adequate heat transfer between the core member 28 and the airfoil member 22, the outer surface 34 of the core member 28 may be bonded to at least 30% of the area of the inner surface 26 of the airfoil member 22. In other embodiments, the core member 28 may be bonded to at least 50% or at least 75% or at least 80% of the inner surface 26 of the airfoil member 22. In one embodiment, the width of the grooves forming the cooling passages 30 is 3 mm and the distance between adjacent cooling passages is 12 mm, providing a bond of approximately 80% of the inner surface 26 of the airfoil member 22 to the outer surface 34 of the core 28.

Figure 1:
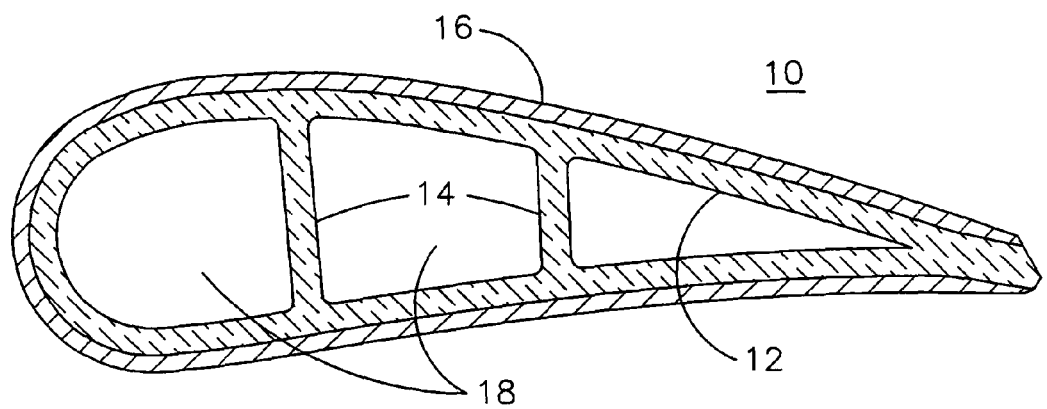
FIG. 1 is a cross-sectional view of a prior art gas turbine vane made from a ceramic matrix composite material covered with a layer of ceramic thermal insulation.

The ceramic matrix composite material of the airfoil member 22 provides mechanical strength necessary to withstand the thermal and mechanical stresses imposed on the vane 20. The core member 28 substantially fills the hollow center of the airfoil member 22 and limits the area of the inner surface 26 that is exposed to the internal pressure loads created by the high pressure cooling fluid 32 and eliminating the ballooning effect experienced with the prior art design of FIG. 1. The reduction of such internal pressure loads is especially beneficial near the trailing edge 39 where the thickness of the CMC material of the airfoil member 22 may be reduced. The core member 28 also provides a damping effect on the dynamics of the vane 20, increasing the rigidity and stiffness of the vane 20 and providing a robust product that is more impact resistant and that may produce a reduced level of acoustic noise than prior art designs. Moreover, the core member 28 provides a much simpler mechanism for defining cooling channels 30 than the prior art techniques of forming passages within the CMC laminate or forming passages by using an internal metal sheath or baffle structure. The cooling passages 30 may be formed on the outer surface 34 of core member 28 by casting the part to include the passages or by machining the passages 30 into the surface 34. Airfoil member 22 may be formed first and used as a mold for the casting of the core member 28. For such a process, a fugitive material may be used to define the space for the passages 30 during the casting of the core member 28. The fugitive material is then removed by heating during a subsequent process step to create the cooling passages 30. Typical fugitive materials include wax, plastic, polystyrene, etc.

The material of construction of the core member 28 affects the performance of vane 20 in the environment of a gas turbine engine. Material properties of particular importance are discussed below.

Because the airfoil member 22 is exposed to higher temperatures than the core member 28, the relative thermal expansion of these two materials may cause tensile stresses throughout the airfoil member 22 and bond 40. A similar temperature gradient may be experienced in applications other than such an airfoil member. Accordingly, it may be desired that the coefficient of thermal expansion (CTE) of the core member 28 be greater than the CTE of the airfoil member 22, in one embodiment at least 10% greater. Other embodiments may have a CTE of the core member 28 that is about 7% greater than the CTE of the airfoil member 22, or in the range of >0 to 14% greater. For other applications, it may be acceptable to have the CTE of the core member 28 in the range of 94% to 120% of the CTE of the airfoil member 22. A difference in thermal expansion coefficients may at least partially compensate for the difference in temperature ranges experienced by the respective materials, thereby more closely matching the physical growth of the materials and minimizing the amount of thermal stress induced in the vane 20.

In order to safeguard the integrity of the heat removal pathway through the bond 40, for certain applications it may be desired that the mechanical strength of the core member 28 be less than the mechanical strength of the bond 40 between the airfoil member 22 and the core member 28. Cracking of the airfoil member 22 material could result in the undesirable leakage of the cooling fluid 32 into the combustion gas flow. Delamination of the bond 40 could result in the loss of cooling and over pressurization and ballooning of the airfoil member 22. Accordingly, it may be desired to maintain the core member 28 as the mechanical weak link in the structure by using a material that has a tensile strength that is less than the tensile strength of the bond 40 and the airfoil member 22.

The core member 28 may be designed to be strain tolerant in order to relax the loads imposed by thermal stresses. A ceramic material such as AN-191 may be used as the core member 28 and will exhibit creep when exposed to tensile loads as a result of micro cracking of the material. Furthermore, it may be desired to maintain the elastic modulus of the core member material to be less than one-half that of the CMC airfoil member material, or in other embodiments to be less than one-third or less than one-tenth that of the CMC airfoil member material. The CMC airfoil member is the desired structural material and it is intended that the airfoil member bear the majority of the loads. If the modulus of the core is too high, the core, not the CMC airfoil member, takes the loads.

The required thermal conductivity of the core member material will depend upon the overall heat load, the number and location of the cooling channels 30, and the thermal conductivity of the CMC airfoil member material. Generally, oxide CMC materials have lower thermal conductivity than do non-oxide based CMC materials, and thus a higher thermal conductivity core member material may be desirable for the oxide CMC materials.

Figure 5:
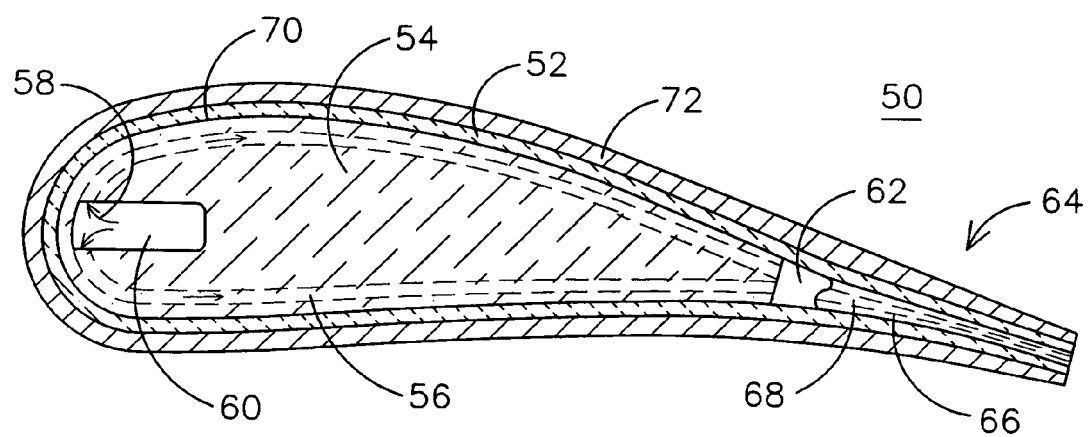
FIG. 5 is a cross-sectional view of a solid-core ceramic matrix composite gas turbine vane having a layer of thermal insulation deposited over the CMC material.

FIG. 5 illustrates another embodiment of an improved gas turbine vane 50. Vane 50 includes a ceramic matrix composite airfoil member 52 having a center that is substantially filled with a core member 54. A first plurality of cooling passages 56 (shown in phantom) are formed through the core member 54, with the cooling fluid 58 passing from an inlet plenum 60 formed along a length of the core member 54 into each respective cooling passage 56. The cooling passages are openings for cooling fluid 58 that are formed proximate the outside surface of the core member 54, and they may take the form of subsurface holes (as illustrated in FIG. 5) or grooves formed in the surface of the core member (as illustrated in FIGS. 2–4). The cooling passages 56 terminate in an outlet plenum 62 formed along the length of the vane 50 proximate a trailing edge portion 64. The outlet plenum functions to redistribute the cooling fluid 58 into the respective inlets of a second plurality of cooling passages 66 formed proximate the trailing edge 64 for eventual discharge into the hot combustion gas passing over the vane 50. One may appreciate that as the cross-sectional thickness of the vane 50 decreases and the temperature of the cooling fluid 58 increases toward the trailing edge portion 64, the cooling requirements for the vane 50 change. Thus, the outlet plenum 62 provides a transition location for establishing a different cooling passage geometry for the trailing edge portion 64. In one embodiment, the number of trailing edge cooling passages 66 is twice the number of cooling passages 56 upstream of the outlet plenum 62, and the size of each respective trailing edge cooling passage 66 is reduced accordingly. Trailing edge cooling passages 66 may be formed as subsurface holes or grooves in a surface of a trailing edge portion 68 of core member 54. In this embodiment, the bond 70 between the airfoil member 52 and the core member 54 encompasses 100% of the surface area of the inside surface of the airfoil member 52 local to the trailing edge region. The bond 70 provides a heat transfer path from the airfoil member 52 to the cooling fluid 58.

The trailing edge portion 68 of the core member 54 of FIG. 5 is fabricated to be a separate piece of material from the remainder of the core member 54. One may appreciate that in other embodiments the core member may be formed of one, two or more separate sections of material. The interface between such sections may be spaced apart as shown in FIG. 5 to form a plenum, or they may be in close contact. A multiple section core may be beneficial for limiting the stresses generated within the core. The joint between such sections may be located along any axis of the airfoil; for example, extending from the leading edge to the trailing edge along the length of the vane to join a top section and a bottom section, or extending from the low pressure side of the airfoil to the high pressure side of the airfoil along the length of the vane to join a leading edge section and a trailing edge section, or extending from the leading edge to the trailing edge along the cord of the airfoil to join an inner section and an outer section. The various sections may be formed of the same material or a different material. In one embodiment, the trailing edge portion 68 of FIG. 5 may be formed of a CMC material while the remainder of the core 54 may be formed of AN-191 material.

Vane 50 of FIG. 5 also includes a layer of insulating material 72 disposed over the airfoil member 52. Insulating material 72 may be of the composition described in U.S. Pat. No. 6,197,424 or other appropriate insulating material, and may be formed (cast) or machined to provide a desired airfoil shape. The airfoil member 52 may be commercially available A-N720 CMC material having mullite-alumina Nextell 720 reinforcing fibers in an alumina matrix, or it may be any other appropriate oxide or non-oxide CMC material. The core member material may be commercially available AN-191 (Saint-Gobain, Worcester, Mass.), for example, or it may be a material having properties specially selected as described above for a particular application.

Figure 6:
FIG. 6 is a photomicrograph of a composite material including a layer of CMC material bonded to a layer of ceria/mullite aggregate material.

Core member 54 will be subjected to a high degree of thermal stress in the region surrounding the cooling passages 30, and therefore a material of construction having a high degree of strain tolerance is preferred for this member. A higher thermal conductivity is also generally desired rather than a lower thermal conductivity for such a material. The present inventor has developed a new material 100 for such applications. Strain tolerant material 100 is illustrated in FIG. 6 as bonded to a layer of structural CMC material 102 to form a composite material 104 useful in high temperature applications such as in a gas turbine engine. The present inventor has found that a highly strain tolerant aggregation can be formed by combining two aggregate materials in a binding matrix material, wherein the two aggregate materials exhibit sufficiently different coefficients of thermal expansion so that thermal stresses generated by differential expansion there between result in the micro cracking within the aggregation. The micro cracking may occur in at least one of the aggregate materials and/or the matrix material. It is known that micro-cracks in a material contribute to the strain tolerance of the material by partially absorbing strain energy and by redirecting and distributing any crack that is formed in the material due to thermal stress. The present invention innovatively exploits that phenomenon by providing a material that will generate a meaningful degree of micro cracking either during the curing/sintering of the material or during the use of the material or both. The degree and location of micro cracking that is developed within the material may be influenced by the selection of the constituent components of the material. The two aggregates used to form the material 100 are selected to have different properties, in particular to have different coefficients of thermal expansion and likely to have different mechanical strengths. The localized stress that is generated in the material due to the differential expansion of the two aggregates will result in at least one of the aggregate materials and/or the binding matrix material developing micro cracks. In the exemplary embodiment illustrated in FIG. 6, material 100 is made of ceria particles 106 ($CeO_2$) and mullite particles 108 [$3(Al_2O_3).2(SiO_2)$]. The ceria particles 106 mullite particles 108 are sinter-bonded with an alumina matrix binder 110 to form material 100. The binder 110 may be introduced as liquid slurry and the material 100 may be formed using known refractory castable processes. The coefficient of thermal expansion of the binder 110 may be between that of the two aggregate materials. The binder 110 may be highly sinterable or have a chemically reactive species to develop sufficient strength to hold the aggregate particles together. A third or more aggregate material may be included, and such additional material(s) may have a coefficient of thermal expansion between that of the first two aggregate materials. For the embodiment of ceria and mullite aggregates, an optional alumina aggregate may also be used.

Differential sintering shrinkage creates an extensive network of micro-cracks 112 within the ceria aggregate. In the ceria/mullite embodiment, the micro cracking preferentially occurs within the ceria aggregate rather than in the mullite aggregate or at the aggregate/matrix bond due to the relatively lower strength of the ceria. Cracks formed in the material will stop at the ceria aggregate because the ceria is weak and will absorb/dissipate strain energy. The micro-cracks 112 provide a desired degree of toughness and strain tolerance for high temperature applications.

The present invention may be embodied with a variety of materials provided that the two aggregate materials exhibit sufficiently different coefficients of thermal expansion so that thermal stresses generated there between during heating of the material result in a degree of micro cracking within the aggregation sufficient to achieve a desired degree of strain tolerance in the material. For example, the aggregate material having the higher CTE may be any of the rare earth oxides, tetragonal zirconia t-$ZrO_2$ (such as 8YSZ), alumina $Al_2O_3$, magnesia MgO, or spinel $MgAl_2O_4$, and/or the aggregate material having the lower CTE may be mullite $3Al_2O_3 2SiO_2$, zircon $ZrSiO_4$, an alkaline earth aluminosilicate such as cordierite 2MgO 2Al$_2$O$_3$ 5SiO$_2$ or celsian BaO Al$_2$O$_3$ 2SiO$_2$, or a low CTE non-oxide such as silicon carbide SIC or silicon nitride Si$_3$N$_4$.

Figure 7:
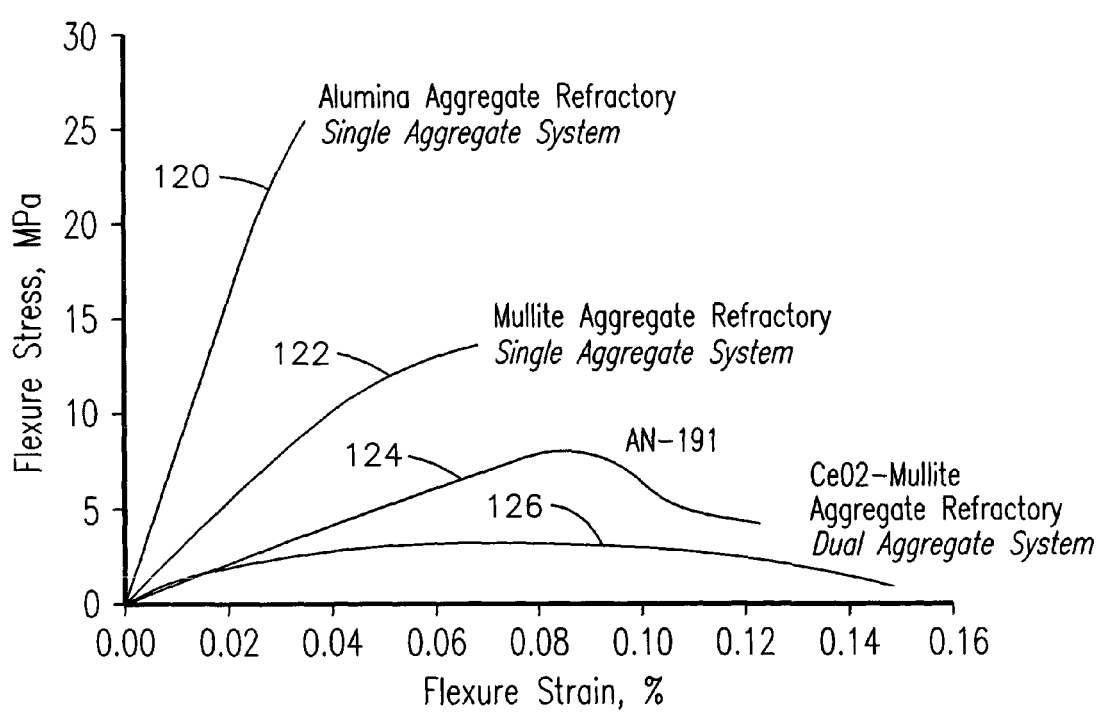
FIG. 7 illustrates the relationship between stress and strain for four different materials.

FIG. 7 illustrates the respective stress/strain relationships of one embodiment of the present invention as compared to several prior art materials. Curve 120 is for an alumina aggregate refractory utilizing a single aggregate system. Curve 122 is for a mullite aggregate refractory utilizing a single aggregate system. Curve 124 is an AN-191 refractory ceramic available from Norton-St. Gobain. Curve 126 is for an embodiment of the present invention utilizing a 35/65% by volume ceria/mullite dual aggregate system in an alumina matrix binder.

Because the coefficients of ceria and mullite are different, the volume ratio of ceria 106 to mullite 108 may be varied to control the coefficient of thermal expansion of the material 100. The coefficient of thermal expansion (CTE) of mullite is about 5.3×10$^{-6}$/° K at 850° C. and that of ceria is about 11.5-12.5×10$^{-6}$/° K at 850° C. (Note, a CTE values quoted herein are at 850° C., which may be an approximate average temperature experienced in an advanced gas turbine engine application.) The ceria/mullite material 10 may be tailored to be from about 5.6×10$^{-6}$/° K. to about 8.0×10$^{-6}$/° K at 850° C., for example. For one embodiment, the CTE may be about 6.5×10$^{-6}$/° K, which is about the midpoint of a range of acceptable CTE values for material 100 when bonded to A-N720 CMC material for a gas turbine vane application. The volume ratio of ceria to mullite aggregate (i.e. the volume ratios of the aggregate added to the slurry to form material 100) may be about 1:2 (33.3%) in certain embodiments. The volume ratio of ceria to mullite may be at least 30% or at least or about 35% or up to about 50%. The optional alumina aggregate in a three-aggregate system may have a volume ratio in relation to the first two aggregates of about or no more than 20%.

Other aggregate materials, for example zirconia, may be in lieu of the example materials for particular applications where appropriate. The relative ratios of the CTE values of the two aggregates, the absolute value of the two CTE values, and the relative strengths of the materials will affect the degree of micro-cracking that is developed within the material. In various embodiments, the difference in the CTE values of two aggregate components is at least 3×10$^{-6}$/° K at 850° C., or greater than 4×10$^{-6}$/° K at 850° C., or greater than 5×10$^{-6}$/° K at 850° C.

Material 100 is cast by combining the desired volumes of ceria 106 and mullite 108 particles together in a binder 110 such as an alumina hydroxchloride matrix slurry. This aggregation is then dried and cured using a regiment appropriate for the selected binder material 110. The material 100 may be bisque-fired and co-cured with a bisque-fired CMC material 102 to form a sinter bond there between. Alternatively, an adhesive material may be used to bond material 100 to another material.

The raw materials used to cast material 100 may be selected to have a specific mesh size range, such as a −10/+20 mesh or −14/+28 mesh for the ceria particles, a −16/+35 mesh for the mullite particles, and a −14/+28 mesh for the alumina particles. The ceria particles may have a nominal size that is larger than the nominal size of the mullite particles. The density of ceria is relatively high (7.28 g/cm$^3$) so the ceria particles have a tendency to settle during the casting process, thereby trapping the mullite particles to form a closed-packed network that functions to limit sintering shrinkage. Only enough of the alumina binder necessary to bond everything together will be trapped within this closed-packed network. Because both ceria and mullite are relatively soft, the material 100 is expected to be machineable in its green state.

A 35/65 volume % embodiment of ceria/mullite material 100 exhibits the following properties:

| | | |
|---|---|---|
| Coefficient of thermal expansion CTE at 850° C.: | | 6.5 × 10$^{-6}$ ° K.$^{-1}$ |
| Thermal conductivity k: | at room temperature | 2.8 W/m ° K. |
| | at 800° C. | 1.6 W/m ° K. |
| Temperature capability | | >1,300 ° C. |
| Secant elastic modulus (90% ultimate strain): | | |
| | at room temperature | 4.1 GPa |
| | at 800° C. | 8.9 GPa |
| Flexure strength: | at room temperature | ~4 MPa |
| | at 800° C. | ~8 Mpa |
| Flexure strain @ peak load: | | |
| | at room temperature | 0.08% |
| | at 800° C. | 0.11% |

One may envision other embodiment of the ceria/mullite material 100. For example, a hollow sphere network of the materials may be used rather than aggregate particles. One or both of the ceria and mullite may take the form of hollow spheres, or hollow spheres may be used in combination with aggregate particles. For a given porosity level, a hollow sphere network should create a stiffer structure than a solid aggregate based material and may have a lower thermal conductivity. Solid spheres of material may also be used in whole or in part.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

The invention claimed is:

1. A material comprising:
   an aggregation of first particles comprising a network of microcracks and second particles within a binding matrix comprising a ceramic material;
   wherein the first particles and the second particles are selected to have sufficiently different coefficients of thermal expansion so that thermal stresses generated there between during heating of the material result in micro cracking within at least the first particles, wherein the first particles comprise ceria and the second particles comprise mullite.

2. The material at claim 1, wherein the difference in coefficients at thermal expansion between the first particles and the second particles is at least 3×10$^{-6}$/°K at 850° C.

3. The material of claim 1, wherein the difference in coefficients of thermal expansion between the first particles and the second particles is at least 4×10$^{-6}$/°K at 850° C.

4. The material of claim 1, wherein the difference in coefficients of thermal expansion between the first particles and the second particles is at least 5×10$^{-6}$/°K at 850° C.

5. The material of claim 1, wherein the binding matrix material has a coefficient of thermal expansion between that of the first particles and that of the second particles.

6. The material of claim 1, wherein the binding matrix material comprises alumina.

7. The material of claim 1, further comprising a volume ratio of ceria to mullite of about 1:2.

8. The material of claim 1, further comprising a volume of ceria to mullite of at least 30%.

9. The material of claim 1, further comprising a volume of ceria to mullite of up to about 50%.

10. The material of claim 1, wherein the aggregation further comprises third particles of alumina within the binding matrix material.

11. The material of claim 10, wherein the volume of The third particles to that of the first and second particles is no more than 20%.

12. The material of claim 1, wherein at least one of the first particles and the second particles comprise hollow spheres.

13. The material of claim 1, wherein the ceria particles have a nominal size that is larger than a nominal size of the mullite particles.

14. The material of claim 1 having a ratio of ceria content to mullite content selected to provide a coefficient of thermal expansion of at least $5.6 \times 10^{-6}$/K at 850° C.

15. The material of claim 1 having a ratio of ceria content to mullite content selected to provide a coefficient of thermal expansion of approximately $6.5 \times 10^{-6}$/°K at 850° C.

16. The material of claim 1, wherein the thermal stresses also result in micro-cracking of the second particles.

17. A composite material comprising:
a ceramic matrix composite material;
an aggregate material comprising first particles comprising a network of microcracks and second particles within a binding matrix comprising a ceramic material bonded to a first surface of the ceramic matrix composite material;
wherein the first particles and the second particles are selected to have sufficiently different coefficients of thermal expansion so that thermal stresses generated there between during heating of the aggregate material result in a degree of micro cracking within at least one of the group consisting of the first particles and the second particles sufficient to achieve a desired degree of strain tolerance in the aggregate material, wherein the first particles comprise and the second particles comprise mullite.

18. The composite material of claim 17, wherein the aggregate material exhibits a coefficient of thermal expansion at least 7% greater than a coefficient of thermal expansion of the ceramic matrix composite material at the same temperature.

19. The composite material of claim 17, further comprising a layer of ceramic thermal insulating material bonded to a second surface of the ceramic matrix composite material, the ceramic thermal insulating material having an outside surface defining an airfoil shape.

20. A material comprising a sintered aggregation of ceria particles and mullite particles within a binding matrix comprising a ceramic material, wherein the ceria particles comprise a network of microcracks.

21. The malarial of claim 20, wherein the sintered aggregation further comprises alumina particles within the binding matrix material.

22. The material of claim 20, wherein the binding matrix material comprises alumina.

23. The material of claim 20, further comprising a volume ratio of ceria particles to mullite particles of about 1:2.

24. The material of claim 20, further comprising a volume of ceria particles to mullite particles of at least 30%.

25. The material of claim 20, further comprising a volume of ceria particles to mullite particles of up to about 50%.

26. The material of claim 20, wherein at least one of the ceria particles and the mullite particles comprise hollow spheres.

27. The material of claim 20, wherein the ceria particles have a nominal size that is larger than a nominal size of the mullite particles.

28. The material of claim 20, having a ratio of ceria content to mullite content selected to provide a coefficient of thermal expansion of at least $5.6 \times 10^{-6}$/K at 850° C.

29. The material of claim 20, having a ratio of ceria content to mullite content selected to provide a coefficient of Thermal expansion of approximately $6.5 \times 10^{-6}$/°K at 850° C.

* * * * *